United States Patent
Patz et al.

(10) Patent No.: US 7,324,464 B2
(45) Date of Patent: Jan. 29, 2008

(54) COMMUNICATION SYSTEM WITH CONNECTABLE INTERFACE DEVICE

(75) Inventors: Kai-Uwe Patz, Wuerzburg (DE); Frank Hielscher, Lohr (DE)

(73) Assignee: Rexroth Indramat GmbH, Lohr am Main (DE)

( * ) Notice: Subject to any disclaimer, the term of this patent is extended or adjusted under 35 U.S.C. 154(b) by 813 days.

(21) Appl. No.: 10/671,197

(22) Filed: Sep. 25, 2003

(65) Prior Publication Data

US 2004/0114584 A1 Jun. 17, 2004

(30) Foreign Application Priority Data

Sep. 28, 2002 (DE) ................ 102 45 465

(51) Int. Cl.
*H04L 12/16* (2006.01)
(52) U.S. Cl. ............. 370/260; 370/264; 370/270; 370/422; 370/423; 370/908
(58) Field of Classification Search ........... 379/260, 379/264, 270, 422, 423, 908
See application file for complete search history.

(56) References Cited

U.S. PATENT DOCUMENTS 6,003,135 A * 12/1999 Bialick et al. ............. 726/29
6,717,382 B2 * 4/2004 Graiger et al. ............. 318/587
7,181,236 B1 * 2/2007 Truong et al. ............ 455/550.1

FOREIGN PATENT DOCUMENTS

DE 197 47 353 A1 10/1997
DE 101 10 776 A1 9/2001

* cited by examiner

*Primary Examiner*—Quynh H. Nguyen
(74) *Attorney, Agent, or Firm*—Michael J. Striker

(57) ABSTRACT

The communication system includes multiple participating devices connected with each other by a data line. At least one connection device for connection to a corresponding participant device defined as associated with it is connected to the data line. The communication system is preferably an IP network and with respective connection devices defined as associated with corresponding participating devices, which are used to connect portable operating and display terminals with the participating devices. For definite identification of the corresponding participating device associated with the respective connection devices, the connection devices include readable means of identifying the corresponding participating device, e.g. including a stored IP address, which is readable by the connected interface device, i.e. the terminal.

18 Claims, 2 Drawing Sheets

COMMUNICATION SYSTEM WITH CONNECTABLE INTERFACE DEVICE

BACKGROUND OF THE INVENTION

1. Field of the Invention

The present invention relates of a communication system with a plurality of participating devices, which communicate with each other by a data line, wherein the data line has one or more connection devices for connecting an interface device for definite communication with a given participating device. Particularly the invention relates to a network with a plurality of participating devices connected in the network and respective defined associated connection devices connected with the network for connecting one or more portable operation and visualization terminals. Further the invention relates to a connection device and an interface device for use in this type of communication system and also to a method of identification of a participating device in this communication system.

2. Description of the Related Art

Current communication systems are used in many technical applications, in which the communication system includes a plurality of participating devices, which are connected with each other by a communication line, in order to be able to communicate with each other by means of the communication line. For example, the control devices used for controlling machines or robots in automated manufacturing plants communicate with each other, in order to guarantee timely synchronized machine operations or robotic motions. The control devices are typically industrial processor systems, for example control means or controllers with a programmable memory or "embedded processor" systems, which do not have their own associated terminal for operating, programming or monitoring, but usually are programmed by a central computer. The central computer is usually connected via data lines with the control devices, so that the central computer is built usually at a remote distant from the manufacturing plant. If an error now occurs in the manufacturing plant operation, it is at least partially unavoidable for an operator to try to find the location of the error or fault, i.e. a simultaneous control both of the program running in the concerned control means and of observation of the machine operations or robotic motions. For this purpose it is thus necessary for the operator to connect a mobile terminal at the location or site with the concerned control means. Usually a connection device either in the connecting line to the central computer or directly to the control means is provided in prior art control systems. Identification information for selection and identification of the concerned and responding control means must usually be given by a terminal, at least in the case, in which the connection device is arranged in the connecting line to the central computer and is not exclusively directly hardwired to the control means. For this purpose the identification information is usually provided in a reference list printed on paper, to which the operator must refer before initiating the communication connection. However it is usually required to continuously adjust and update the reference list to include all changes in the communication system. Especially with frequent changes in the plant this requires a very great deal of work. Furthermore in practice the reference list frequently has errors, whereby erroneous operation or primarily no connection is established.

In order to obtain an improvement German Patent DE 101 10 776 A1 discloses a mobile electronic operating and/or monitoring device, which permits a wireless communication with the control means of a machine to be monitored. A definite association or connection of this operating and/or monitoring device to the control means of the machine to be monitored is possible either by means of an interface for direct wireless location or by means of tuned transmitting and/or reception devices with spatially limited receiving and/or transmitting operating ranges. The operation and/or monitoring of the machine can occur according to this reference, but also by means of other devices besides this prior art device. The disadvantage of the operating and/or monitoring device according to this DE reference is that the wireless transmission devices are very expensive, since both transmitting and receiving devices must be provided. Furthermore a bidirectional protocol, a so-called bidirectional handshake, must take place in order to guarantee mutual identification and mutual transmission and reception readiness. Furthermore it is not possible to provide fixed wired safety circuits, which can be connected with the mobile terminal.

SUMMARY OF THE INVENTION

It is an object of the present invention to provide a communication system with a plurality of participating devices, which are connected with each other by means of a common data line, in which it is possible to connect a participating device with an interface device. The apparatus expense should be as little as possible. Furthermore the connection should be definite, error free and made with little operator effort.

Furthermore it is also an object of the present invention to provide an interface device, with which a desired definite and error-free connection with a participating device of the communication system is possible in a manner that is comfortable to or convenient for the operator.

It is a further object of the invention to provide a method of identification of a participating device of the communication system.

These objects and others, which will be made more apparent hereinafter, are attained in a communication system with a plurality of participating devices, which are connected with each other by a communication line, and with one or more connection devices for connecting the interface device for communication with a participating device defined as associated with the one or more connection devices, the one or more connection devices being connected with the communication line.

According to the invention the one or more connection devices each comprise readable means for identifying the participating device associated with the one or more connection devices, wherein the readable means is readable by the interface device connectable to the one or more connection devices.

The interface device for communication with one of the participating devices is also a part of the present invention. A method of identifying a participating device defined as associated with a given connection device in the communication system according to the invention is also part of the present invention.

The communication system according to the invention includes a plurality of participating devices, which are connected with each other by a common communication line. Furthermore the communication system includes one or more connection devices for connecting an interface device for communication with a particular participating device, which is defined as associated with the one or more connection devices. The connection device is similarly connected with the communication line. In order to identify the participating device that is defined as associated with a particular connection device, the connection device according to the invention includes readable means for identifying the particular participating device defined as associated with the connection device. For that purpose the readable means is readable by an interface device connected to the connection device.

The participating devices and the connection devices also are thus distributed along a common communication line or also coupled with each other and to the common connection line. The communication system is arbitrarily expandable, since additional participating devices and/or connection devices can be coupled to the system. A separate connection line branching from the communication line can be provided for coupling of the participating devices or the connection devices. A suitable communication line is constructed as a data line, for example as a bus system, as known from the state of the art.

The participating device and the connection devices associated with them thus need not be directly connected with each other or arranged at a predetermined position on the communication line, but can be coupled to the communication line at an arbitrary position. Thus it is possible to put the connection device or devices at a position on the communication line that is easily accessible for the operator, so that there is no need to make the associated participating device easily accessible. Thus for example an operator can connect the interface device to the connection device in a comfortable manner and communication with the associated participating device is thus possible with the associated participating device. A portable operating and display unit, for example a portable terminal with a keyboard and monitor, is suitable as interface device. Input and execution of commands by means of the keyboard and the monitor for observation of the program operation is possible.

In contrast to the procedure described in German Patent Application DE 101 10 776 A1 the connections are wired here, i.e. by means of a communication line. In this reference wireless connection is described. The wired connection described here has significant advantages compared to wireless connections. Especially no transmitting and receiving devices are required, whereby the apparatus is considerably simplified and costs are reduced. Furthermore interference of operation of the connection devices by adjacent transmitters and receivers is avoided. Thus also no minimum spacing of the connection devices from the adjacent connection devices is necessary to guarantee an error-free operation of the respective connection devices in the arrangement of the connection devices according to the invention. A wired communication is reliable and without problems regarding environmental influences, such as interfering signals by lightning and other signal sources.

However it is necessary to provide a definite association of the connection device or connection devices to the respective participating device associated with it or them. In this way a direct communication connection can be made between an interface device connected to the respective connection device and the related participating device via the communication line. For this purpose each of the connection devices of the communication system according to the invention includes readable means for identification of the participating device associated with that connection device. The readable means is readable by an interface device connected to the connection device. Correlation or identification information statements are stored in the readable means for identification of the participating device definitely associated with the connection device. Both the availability of the identification statements and the occurrence of the identification of the associated participating device occur preferably completely automatically and especially without the performing of an operation step by the operator. Because of this feature operator convenience is considerably improved, since the operator need not be informed regarding the topology of the communication system. Also the identification code does not need to available and input to the system, in order to be able to communicate with a particular participating device associated with the connection device by means of an interface device connected with the connection device. Furthermore operation reliability is considerably improved by the communication system according to the invention, since an erroneous identification of the participating device is no longer possible by providing an erroneous identification code.

The communication system according to the invention is appropriately embodied as a local network. The topology and also operation procedures for this local network, for example the communication protocol for the participating devices, are known in the state of the art and can largely be used in the present invention. It is particularly preferred that the communication system is embodied as an Ethernet network and especially an IP network (IP=internet protocol). Because of the wide use of Ethernet networks components for Ethernet networks are economically commercially available and sold in numerous locations. The embodiment of the network as an IP network provides the further advantage that the communication system according to the invention can be operated as part of the worldwide Internet network and thus communication can be established from any position within the communication system according to the invention with any participating device in the worldwide Internet network, and vice versa. If the communication system is formed as an IP network, it is especially appropriate to store an IP address of the participating device defined as associated with the connection device in the readable means in the connection device. The participating device is definitely identified by means of the IP address.

In a preferred embodiment of the invention the participating devices are control means for controlling machines and/or robot units. When the communication system according to the invention includes control means, it is possible, on the one hand, to follow the program operation for the control means with the help of a mobile interface device at the site of the control means and perform needed changes or other operations. On the other hand, it is no longer necessary, as in DE 101 10 776 A1, to position the control means spaced from each other in order to avoid an erroneous interaction of the transmission and reception units.

The communication system according to the invention appropriately includes a plurality of connection devices for connection of one or more terminals, wherein the connection devices are connect at positions on the communication line independently of the participating devices associated with them. Each connection device is associated with exactly one and only one participating device and includes readable means for identification of associated participating devices, in which associated correlation information is stored regarding the associated participating devices. For this purpose at least one connection device is provided for each participating device. However several connection devices can be provided for a participating device. It is appropriate to consider however that communication with the participating device would occur with only one interface device actively communicating with the participating device at any given time during operation of the participating device.

The preferred readable means for identification of the participating device defined as associated with the connection device, which is integrated in the connection device, is a programmable controller. Appropriately the programmable controller is readable and connectable with the interface device by means of a separate connecting line provided in the connection means, preferably a separate serial connecting wire, so that communication lines of the connecting means are not involved with the readout procedure and the identification procedure. It is especially appropriate when the programmable controller comprises a permanent memory device for storage of the correlation and/or identification information. The permanent memory device is appropriately programmable by means of the interface device in a configuration stage.

In an especially suitable further embodiment of the invention the connection device comprises additionally a safety line, which makes a direct hard-wired connection between the associated participating device and the connected interface device. The safety line is appropriately either connected with a safety circuit arranged in the participating device or in the interface device or is part of this safety circuit. Thus the connected interface device can act directly on the safety circuit. This sort of safety circuit can be, for example, an emergency shut-off circuit.

The connection device also can comprise a voltage supply line for supplying power or voltage to the interface device. So that no additional power supply need be provided for the interface device, the interface device is appropriately provided with a battery current supply, in order to permit change of the connection device without powering the interface device down.

The above-described connection device for use in the communication system according to the invention is another aspect of the present invention. The connection device is either directly connectable or connectable by means of a connection line with the communication line.

An interface device for use in a communication system according to the invention described above is another aspect of the present invention. The interface device can be a portable operating and display unit, preferably a portable terminal, which has means for reading and further processing the readable means of the connection device according to the invention. The means for reading the readable means of the connection device includes separate connecting lines separate from the remaining communication lines, which are appropriately formed as leads of a multipole plug formed complimentary to the connection device. The interface device according to the invention is also appropriately equipped with connector elements for additional lines from a safety cable provided in the connection device and/or of a power supply cable.

The method of identification of a participating device defined as associated with a particular connection device in a communication system is another aspect of the present invention. For this purpose the communication system especially is the constructed as the above-described communication system according to the invention and includes a plurality of participating device, which are connected with each other by means of a common communication line. Furthermore the communication system comprises at least one connection device for connection of the interface device for communication with exactly that definite participating device that is defined as associated with the connection device. The connection device is connected for this purpose with the communication line. This method includes the following method steps:

a) connecting the interface device to the connection device;

b) reading a readable means for identification of the connection device as associated with the definite participating device, preferably reading an IP address arranged, in the connection device; and c) making a communication connection between the interface device and the connection device defined as associated with the participating device.

Preferably the method according to the invention can be further formed according to the requirements or features of the communication system according to the invention.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
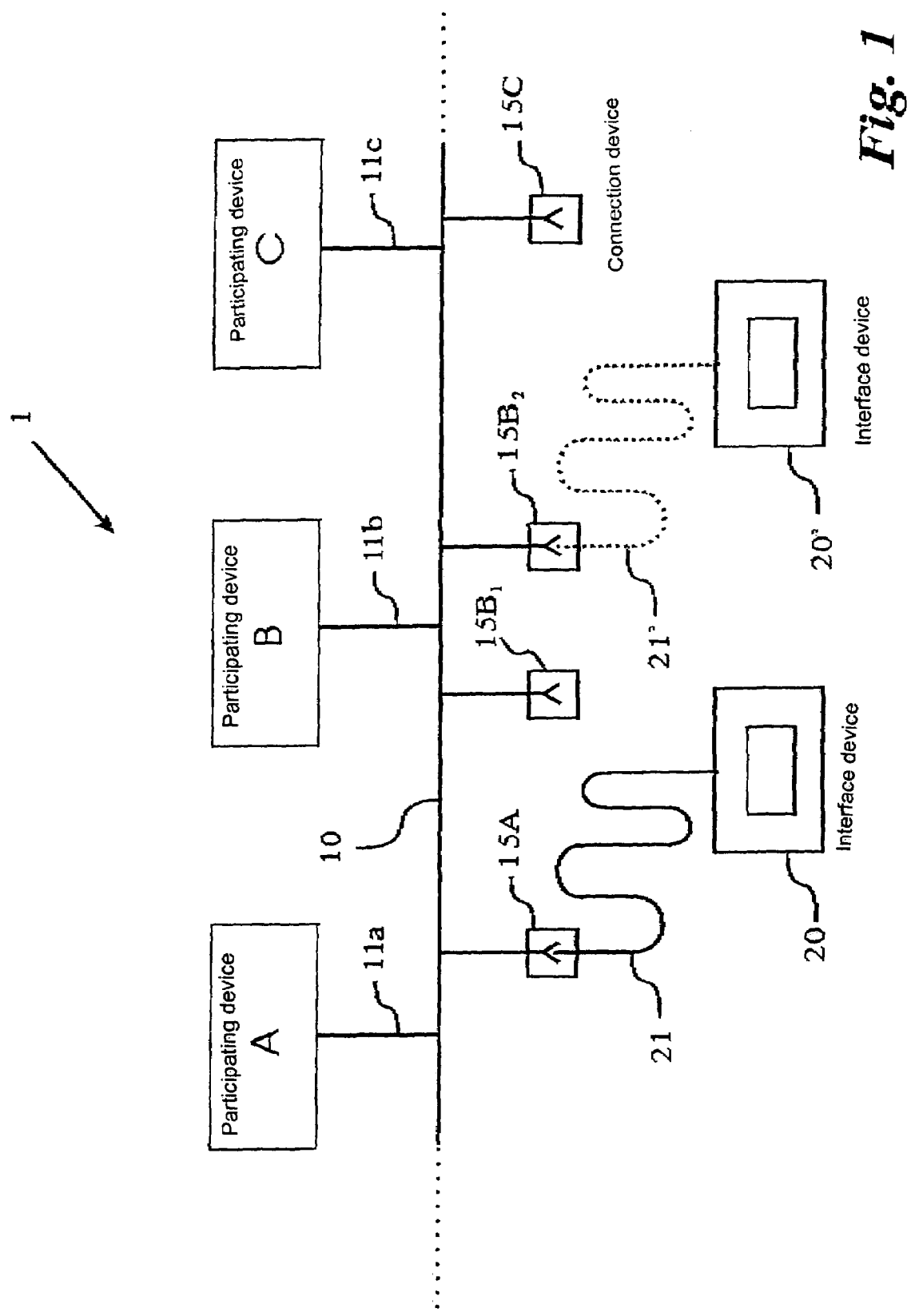
FIG. 1 is a block diagram of a communication system according to the invention.

FIG. 1 is a block diagram of a communication system 1 constructed according to the invention. The communication system 1 comprises a communication line 10, which extends to both sides of FIG. 1, as shown by the dashed extensions of the communication line 10. As shown further in FIG. 1, three participating devices branch off from the communication line 10, which are shown here as control devices A, B and C above the communication line 10, which are connected by means of the respective intervening connecting lines 11a, 11b, 11c with the communication line 10. The arrangement of the branch lines 11a, 11b, 11c above the connection line 10 is of course arbitrary and serves only to simplify the illustration. In the same manner the intervening connecting lines 11a, 11b, 11c to the participating devices A, B, C could be shown branching laterally or downward from the communication line 10, or the participating devices A, B, C could be shown coupled directly to the communication line 10 without intervening connecting lines. Also more or less participating devices can be coupled to the communication line 10.

The participating devices A, B, C of the communication system 1 shown in FIG. 1 are control means or control devices, for example of one or more machines, or a manufacturing unit or a robot plant. The purpose of the control devices can be control of motions or running process, especially the travel processes of one or more adjusting motors of a robotic unit. Thus the operation and/or running behavior of a manufacturing robot can be controlled by means of one or more control devices. Often several such manufacturing robots are arranged in a group near each other in manufacturing units, so that they can perform manufacturing process steps that are closely connected with each other.

The programming and monitoring of control devices occurs usually by means of programming and monitoring devices not shown in FIG. 1, for example by means of a processor, which is connected with the control devices A, B, C by means of the communication line 10 and communicate with each other by means of that communication line 10. However if problems occur during operation of one of the control devices, it is partly unavoidable, that control programs and control behavior in the concerned control device must be tested at the site or location of the control device. For this purpose the connection devices 15A, 15B₁, 15B₂ 15C are coupled to the communication line 10, so that a signal from one of the connection devices 15A, 15B₁, 15B₂, 15C can be conducted into the communication line 10 and picked off or received from the communication line 10. The connection devices 15A, 15B₁, 15B₂, 15C are however not directly connected, but only indirectly connected, with the control devices A, B, C. Furthermore the connection devices 15A, 15B₁, 15B₂, 15C are constructed so that an interface device 20 acting as interface for the operator, so-called HMI ("HMI"=human machine interface), can be connected to the respective connection devices 15A, 15B₁, 15B₂, 15C. For this purpose the connection devices are constructed as multi-pole connector plugs. The connection devices can be unoccupied, i.e. one or more or all the connection devices can be connected to no interface device. Thus an operator can connect an interface device to a connection device or remove it from this connection device according to need. A portable operation and/or display unit, e.g. a lap top computer, can especially be the interface device. A portable operation and/or display unit 20 is shown connected by a connecting line 21 in FIG. 1. Another portable operating and display unit was connected to the connection device 15B₂, again as shown in FIG. 1 with 20' and the connecting line 21' shown with a dashed line.

Each connection device 15A, 15B₁, 15B₂, 15C is associated, above all, with exactly one control device A, B or C. The connection device 15A is associated with control device A. The connection devices 15B₁ and 15B₂ are both associated with the control device B. The connection device 15C is associated with the control device C. Of course, communication of all participating devices of the communication system 1 with each other is possible by means of the common communication line 10. However in order to prevent erroneous or faulty operation, it is not possible to communicate with one and the same connection device with all control devices, in which the control program of the concerned control device or the control process itself is activated. Such communication, which is directed to activating the control program or the concerned control device or the control process itself, can only be started and conducted by the one of the control device definitely associated with the particular connection device. However more than one connection device can be provided and associated with one control device. The connection devices are advantageously arranged so that a lap top computer can be connected to it with a conventional cable length to the connection device and the lap top computer can be placed in a satisfactory accessible location for an operator.

The association of a connection device to exactly one control device is especially required in order to prevent erroneous operation of the control devices. For this purpose suitable safety elements are provided in the connection device, for example a safety line or a safety circuit. This safety element can be provided on the one hand for preventing an erroneous operation of the control device by the operating and display unit, for example so as not to exceed a maximum travel range of a rotor arm. For example, an emergency shut down can be activated by safety elements provided in the connection device, also immediately in a safety circuit or safety element of the control device. Also activation of only the control device associated with the connection device and no other control device can be guaranteed by safety elements provided in the connection device, which are designed as redundancy elements for testing and verifying access authorization. For this purpose an additional connecting line is provided in the connection device as a safety line, which makes a wired connection between the control device and/or an active safety circuit of the control device, at one end, and the operating and display unit, at the other end, as soon as the operating and display unit is connected.

These safety features are especially appropriate when the communication line 10, as shown in FIG. 1, is constructed as an Ethernet cable as part of an IP network, in an especially preferred embodiment of the invention. The control devices acting as participating devices in the IP network are then associated with respective IP addresses, by which the control device are definitely callable from all parts of the network.

Since each connection device 15A, 15B₁, 15B₂, 15C is indeed associated with one control device A, B or C and the connection devices 15A, 15B₁, 15B₂, 15C are however not exclusively connected hardwired with the associated control device A, B or C, but are connected by communication line 10 with all control device A, B and C connected to the communication line, it is necessary to provide or establish an association of each connection device 15A, 15B₁, 15B₂, 15C to a single control device. According to the invention each connection device 15A, 15B₁, 15B₂, 15C comprises, for this purpose, readable means for identification of the particular participating device defined as associated with the connection device. The readable means is readable by the interface device 20 connectable to the connection device. In the embodiment shown in FIG. 1 the readable means is designed as a memory device and arranged in the respective connection devices 15A, 15B₁, 15B₂, 15C. The IP address of the respective control device A, B or C is stored in the memory device. An operating and display unit 20, which is connected to the respective connection devices 15A, 15B₁, 15B₂, 15C, reads the IP address from the memory device and makes a connection for data communication with the associated control device A, B or C.

Figure 2:
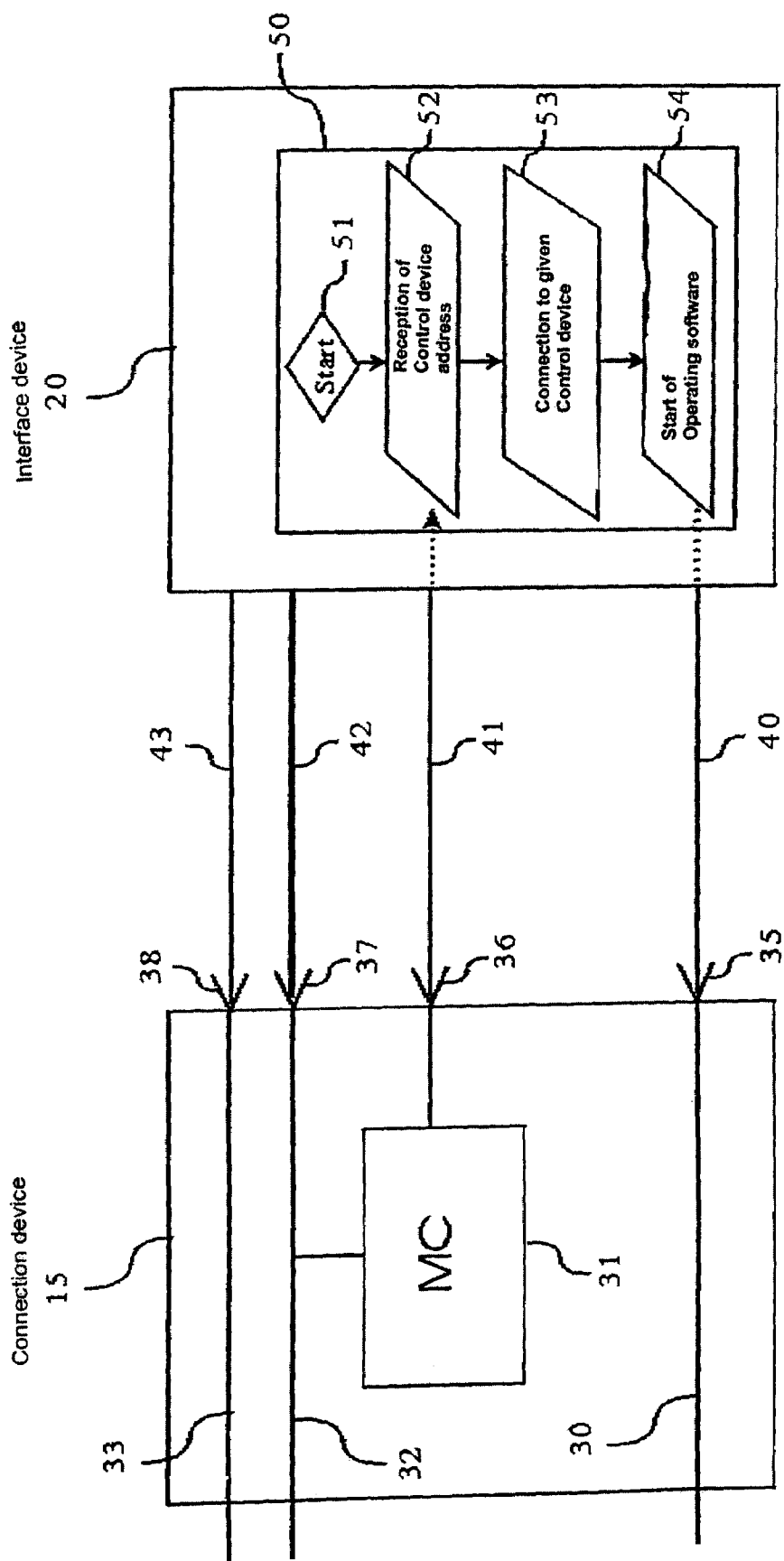
FIG. 2 is a diagram showing a connection device constructed according to the invention with a portable operating and display unit connected to it.

In the embodiment of FIG. 2 the connection device 15 is shown connected with a portable operating and display unit 20. The connection device 15 comprises a Ethernet terminal 35 connected with an Ethernet line 30, a microcontroller 31 with a microcontroller terminal 36, a voltage supply line 32 with a voltage supply terminal 37 and a safety line 33 with a safety terminal 38. The safety line 33 is connected as a connecting line with a safety element or a safety circuit for associated control. All terminals 35, 36, 37 and 38 are assembled in a connector, for example a plug connector. If a portable operating and display unit 20 is connected, thus, as shown in FIG. 2, all four terminals 35, 36, 37 and 38 are each connected with the opposing terminals or connecting elements 40, 41, 42 and 43 of the portable operating and display unit 20. Also the connecting elements 40, 41, 42 and 43 are appropriately assembled in a similar plug connector.

For identification of the participating device defined as associated with the connection device 15 the microcontroller 31 includes a memory device not shown in FIG. 1, which can be embodied as an $E^2PROM$ and in which the IP address of the associated participating device, here the control means, is stored in a readable form.

If the portable operating and display unit 20 is now connected to the connection device 15, a software program or programs 50 is started in the operating and display unit 20 as shown in block 51. The connection data is read out in the first program step 52, especially in a preferred embodiment the IP address is read out from the E²PROM of the microcontroller 31. In a second program step 53 a connection to that participating device A, B or C, which is associated with the connection device 15 and identified by means of the IP address, is established on the basis of the read-out connection data read out by means of the Ethernet communication line 30 and 10 (10 in FIG. 1). To establish the connection usually a connection making protocol is executed. Next the operating and display software for operating and displaying the running of the participating device is started in a further program step 54.

The E²PROM of the microcontroller 31 is appropriately programmable in an initialization step of a configuring menu displayed on the portable operating and display unit 20. In this way the IP address of the associated participating device is stored in the E²PROM.

The operational convenience of an operator is increased by means of the embodiment of the communication system according to the invention shown in FIGS. 1 and 2, since the identification of the associated participating device takes place completely automatically and no manual control selection is necessary. Furthermore protection against erroneous or possible faulty operation can be provided, since only parts of the manufacturing plant can be operated, which are reliably connected with the respective connection device. In addition, the safety line can be connected so that one or more safety circuits, for example an emergency shut-off device, in the control device can be activated immediately.

The disclosure in German Patent Application 102 45 465.5-31 of Sep. 28, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a communication system with a connectable interface device and to a method of identification of a participating device connected with the interface device in the communication system, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A communication system for communicating with multiple participating devices, said communication system comprising
 a plurality of the participating devices,
 a communication line connecting the participating devices with each other, and
 one or more respective connection devices for connecting an interface device for communication with a corresponding one of the participating devices indirectly via said communication line, said corresponding participating device being defined as associated with said one or more respective connection devices, said one or more respective connection devices being connected with the communication line;
 wherein said one or more respective connection devices are not included in said participating devices and are also not included in said interface device;
 wherein said one or more respective connection devices comprise readable means for identification of said corresponding participating device defined as associated with said one or more respective connection devices, wherein said readable means is readable by said interface device connectable to the one or more connection devices;
 wherein each of said respective connection devices connects said interface device with said corresponding one of said participating devices associated therewith, but with no others of said participating devices, when said interface device is connected with each of said respective connection devices;
 wherein said readable means for identification of said corresponding participating device defined as associated with said one or more respective connection devices is a programmable controller; and
 wherein said programmable controller is connectable and readable by means of a separate connecting line provided in said one or more respective connection devices and comprises a memory device for storage of identification information, said programmable controller being programmable during a configuration stage by said interface device.

2. The communication system as defined in claim 1, comprising a local network including said participating devices.

3. The communication system as defined in claim 2, wherein said local network is an Ethernet network.

4. The communication system as defined in claim 2, wherein said local network is an IP network.

5. The communication system as defined in claim 1, wherein said communication line is a data line.

6. The communication system as defined in claim 1, wherein the interface device is an operating and display unit.

7. The communication system as defined in claim 6, wherein said operating and display unit is a portable terminal.

8. The communication system as defined in claim 1, wherein said participating devices each comprise control means for controlling at least one machine and/or robot unit.

9. The communication system as defined in claim 1, wherein said programmable controller is a microcontroller.

10. The communication system as defined as claim 1, wherein said separate connecting line is a separate serial connecting wire.

11. The communication system as defined in claim 1, wherein said one or more respective connection devices comprises a safety line, and said safety line connects said corresponding participating device directly with said interface device connected to said one or more respective connection devices.

12. The communication system as defined in claim 1, wherein said one or more respective connection devices comprise a voltage supply line for supplying voltage to said interface device.

13. The communication system as defined in claim 1, comprising an IP network and wherein said readable means stores a readable IP address of said corresponding participating device defined as associated with said one or more respective connection devices.

14. A connection device for connecting an interface device to an associated participating device as a communication system indirectly via a connection line, said communication system comprising multiple participating devices connected by said communication line, wherein said connection device is not part of said participating device and is also not part of said interface device;

wherein said connection device comprises readable means for identification of a corresponding participating device defined as associated with said connection device, said readable means is readable by said interface device connectable to the connection device, and said connection device is connected to said communication line for communication with said corresponding participating device;

wherein each of said respective connection devices connects said interface device with said corresponding one of said participating devices associated therewith, but with no other of said participating devices, when said interface device is connected with each of said respective connection devices;

wherein said readable means for identification of said corresponding participating device defined as associated with said one or more respective connection devices is a programmable controller; and wherein said programmable controller is connectable and readable by means of a separate connecting line provided in said one or more respective connection devices and comprises a memory device for storage of identification information, said programmable controller being programmable during a configuration stage by said interface device.

15. The connection device as defined in claim 14, further comprising a safety line, and wherein said safety line connects said corresponding participating device directly with said interface device when said interface device is connected.

16. The connection device as defined in claim 14, further comprising a voltage supply line for supplying voltage to said interface device when said interface device is connected.

17. A method of identifying a participating device of a communication system, wherein said communication system comprises multiple participating devices, a communication line connecting said participating devices with each other and at least one connection device for connecting an interface device for communication with a corresponding one of the participating devices indirectly via the communication line, said corresponding participating device being defined as associated with the at least one connection device and not including said at least one connection device, said at least one connection device being connected with the communication line; wherein the at least one connection device comprises readable means for identification of the corresponding participating device defined as associated with said at least one connection device, said readable means is readable by said interface device connectable to the at least one connection device, said readable means for identification of said corresponding participating device defined as associated with said one or more respective connection devices is a programmable controller, said programmable controller is connectable and readable by means of a separate connective line provided in said one or more respective connection devices, said programmable controller comprises a memory device for storage of identification information, and said programmable controller is programmable during a configuration stage by said interface device, wherein said method comprises the steps of:

a) connecting said interface device to said at least one connection device;

b) reading said readable means for identification of the corresponding participating device defined as associated with said at least one connection device; and c) making a communication connection between the interface device and the corresponding participating device defined as associated with said at least one connection device, said communication connection connecting the interface device with the corresponding participating device indirectly by means of said at least one connection device via the communication line; and wherein each of said respective connection devices connects said interface device with said corresponding one of said participating devices associated therewith, but with no others of said participating devices, when said interface device is connected with each of said respective connection devices.

18. The method as defined in claim 17, wherein said reading said readable means for identification of the corresponding participating device comprises reading an IP address stored in the readable means.

\* \* \* \* \*